May 6, 1958  R. W. JEFFS  2,833,208
MACHINE FOR EDGE-MARKING PANELS
Filed Dec. 22, 1953  6 Sheets-Sheet 1

INVENTOR.
Robert W. Jeffs
BY Barnes, Seal & Secrest
attys.

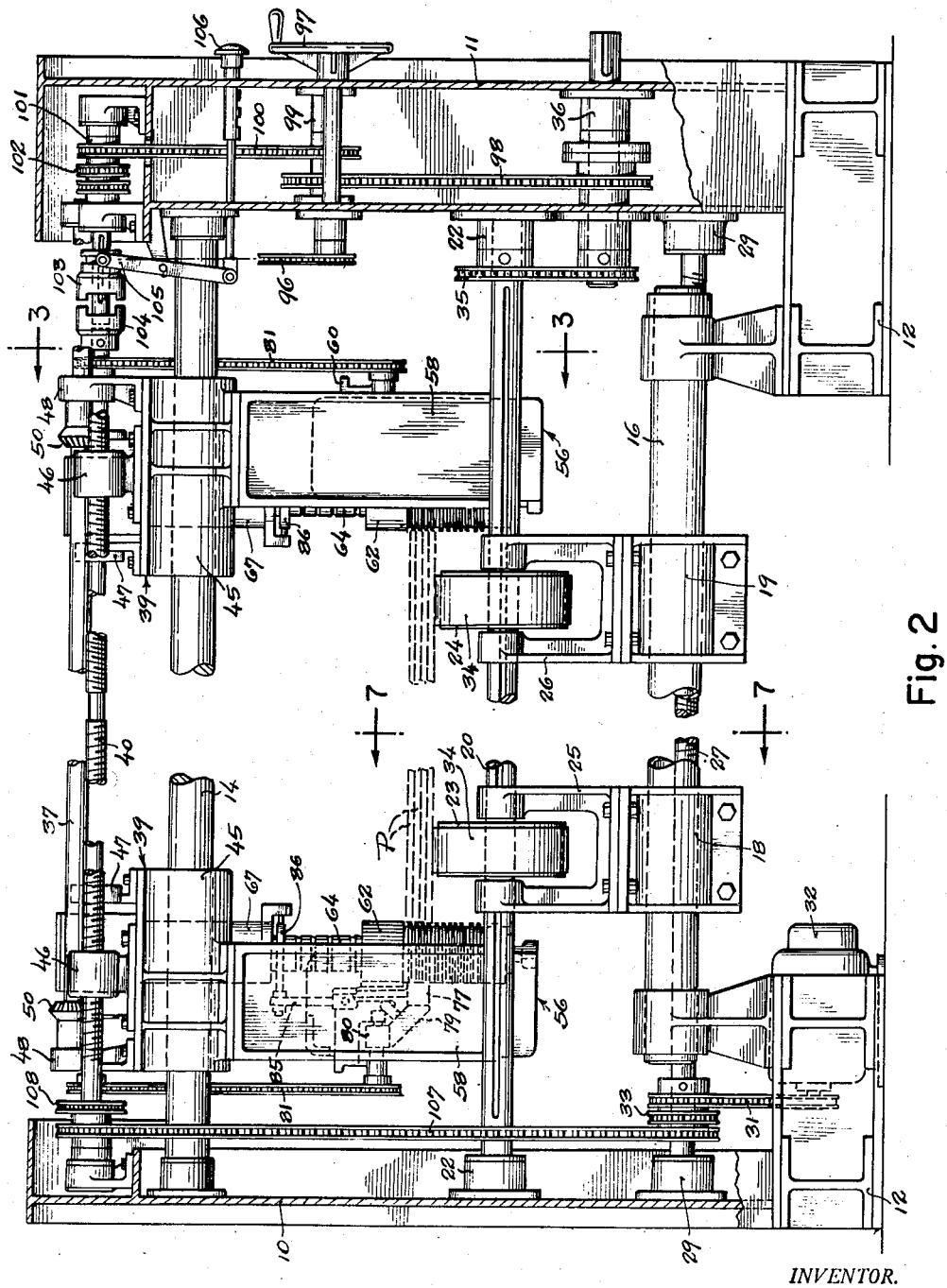

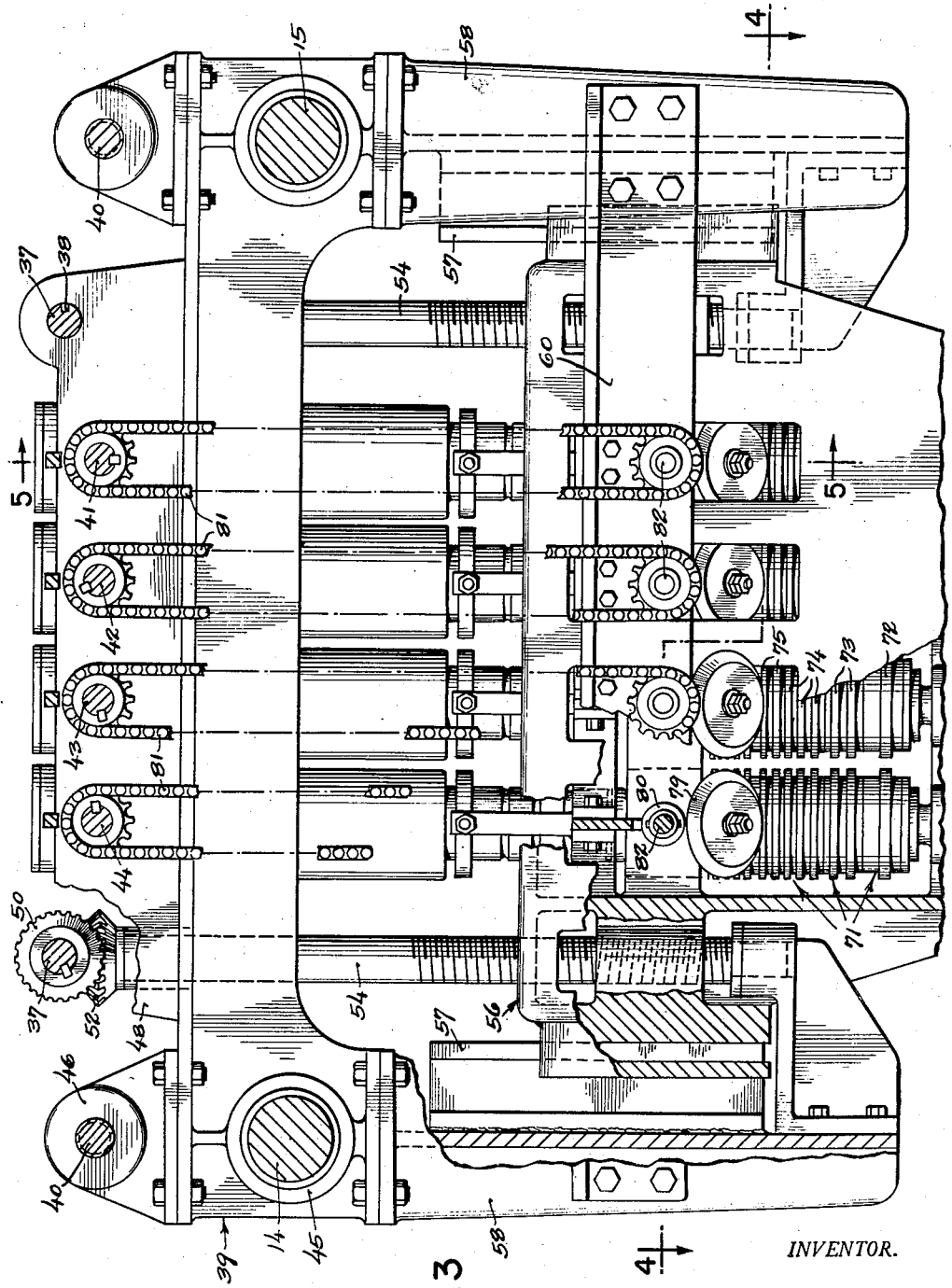

May 6, 1958 R. W. JEFFS 2,833,208
MACHINE FOR EDGE-MARKING PANELS
Filed Dec. 22, 1953 6 Sheets-Sheet 4

INVENTOR.
Robert W. Jeffs
BY Barnes, Seed & Secrest
attys

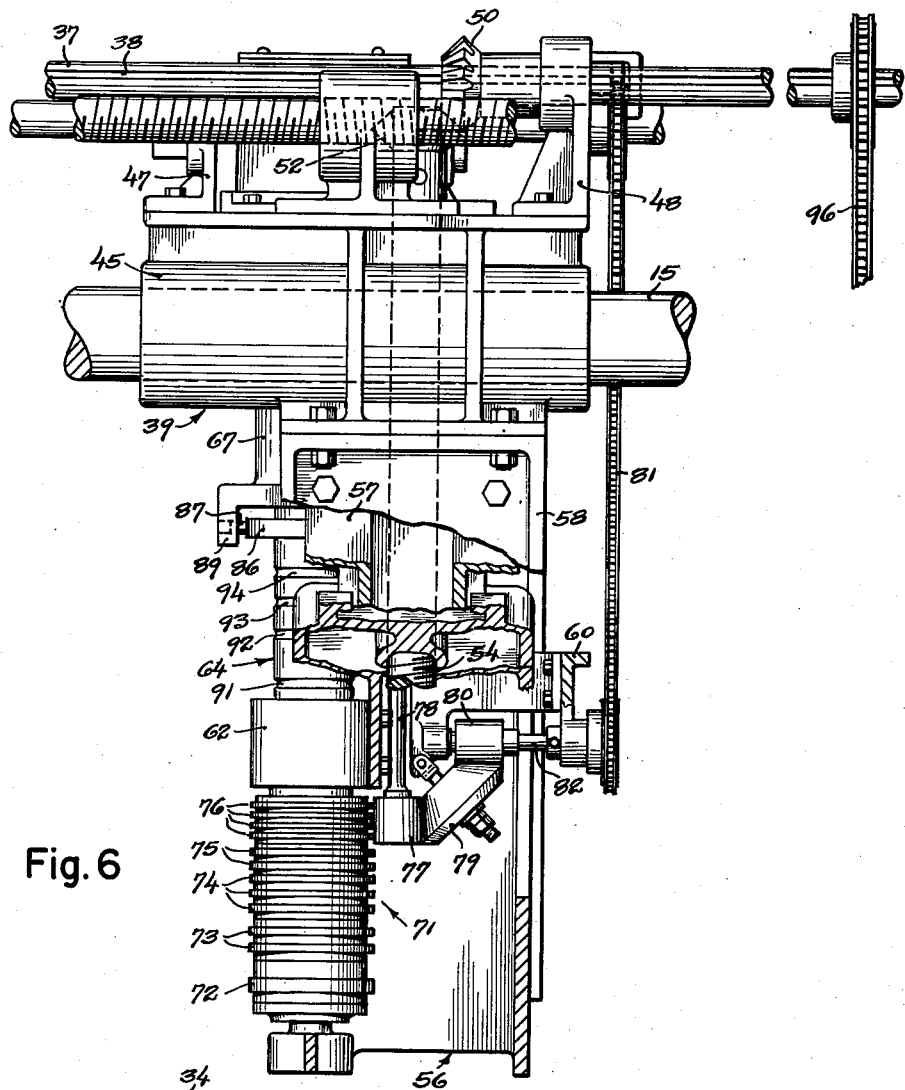

May 6, 1958 R. W. JEFFS 2,833,208
MACHINE FOR EDGE-MARKING PANELS
Filed Dec. 22, 1953 6 Sheets-Sheet 6

INVENTOR.
Robert W. Jeffs
BY
Barnes, Seed & Secrest
attys.

United States Patent Office 2,833,208
Patented May 6, 1958

2,833,208

MACHINE FOR EDGE-MARKING PANELS

Robert W. Jeffs, Seattle, Wash., assignor to Western Gear Works, Seattle, Wash., a corporation of Washington Application December 22, 1953, Serial No. 399,722

13 Claims. (Cl. 101—37)

This invention relates to a machine for edge-marking panels of plywood or other like or suitable material for the purpose of impressing desired words, symbols or other characteristic marks upon the panels. For its general object the invention aims to provide an apparatus for this purpose which permits conveyed panels to be edge-marked in course of the conveyed travel and which adapts itself selectively both to panels of varying widths and of varying thicknesses, and which has a high capacity in that the panels conveyed through the machine may be fed in stacks and at a comparatively rapid rate of speed.

More particular objects and advantages will, with the foregoing, appear and be understood in the course of the following description and claims, the invention consisting in the novel construction and in the adaptation and combination of parts hereinafter described and claimed.

In the accompanying drawings:

Fig. 2 is a fragmentary transverse vertical sectional view drawn to an enlarged scale on the jogged line 2—2 of Fig. 1.

Fig. 3 is a fragmentary longitudinal vertical sectional view drawn to a yet larger scale on line 3—3 of Fig. 2.

Fig. 6 is an end elevational view of the structure shown in Fig. 3 and with parts broken away and shown in section.

Fig. 7 is a fragmentary longitudinal vertical sectional view on line 7—7 of Fig. 2.

Figure 1:
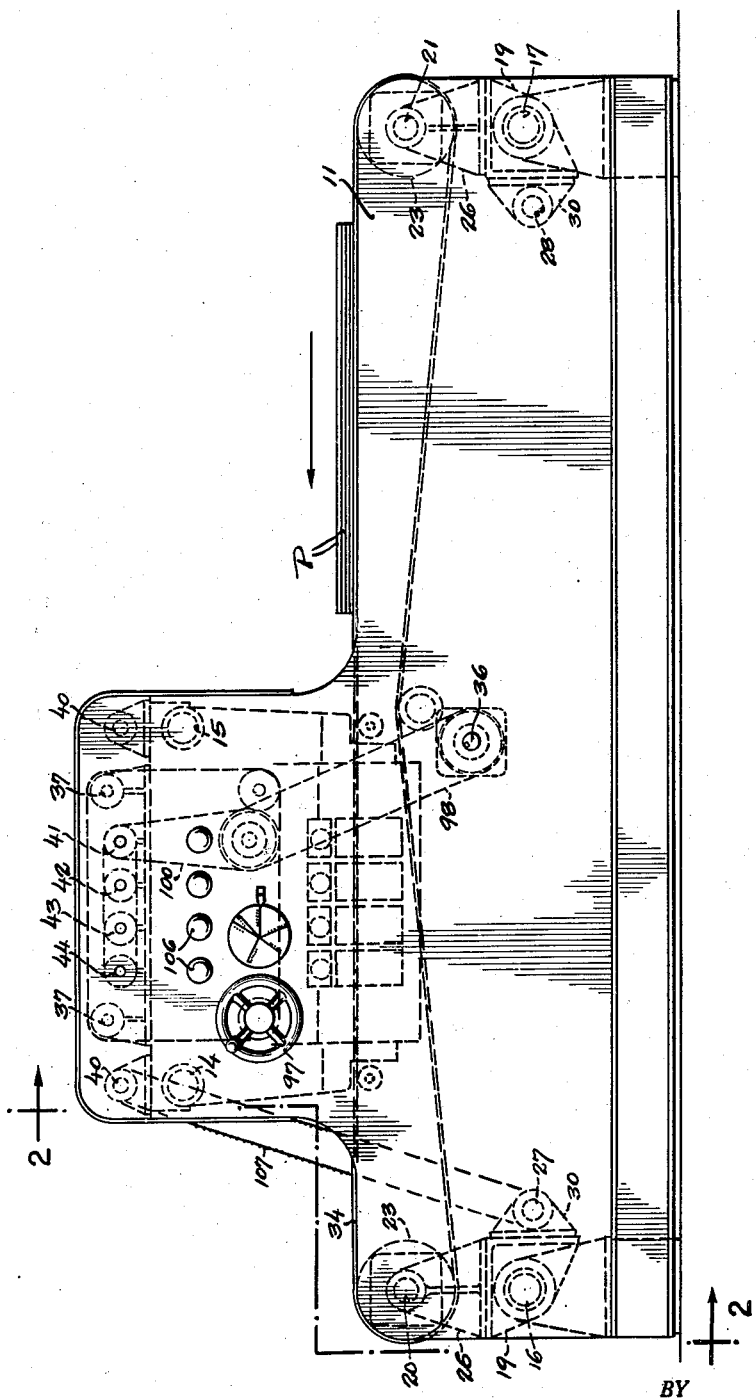
Figure 1 is a side elevational view illustrating an edge-marking machine constructed in accordance with the preferred teachings of the present invention.

The machine of the present invention is provided with a stationary main frame comprising transversely spaced cheek-plates 10 and 11 footing upon a respective bed-plate 12, and having rigid spanners extending transversely from one to the other cheek-plate adjacent the top and bottom of the frame. There are, more particularly, two longitudinally spaced top spanners designated by 14 and 15, and two longitudinally spaced bottom spanners 16 and 17. Each such spanner is given a circular cross-section and in addition to stiffening the frame serves the office of a slide mounting. In the instance of the lower spanners 16 and 17 each has a pair of axially spaced blocks 18 and 19 slidably mounted thereon. Somewhat above and parallel with each lower spanner is an arbor, as 20 and 21, journaled by its ends in frame-carried rigid bearings 22, and keyed so as to rotate in unison with each of these arbors while permitting endwise movement thereon are a pair of pulley-wheels 23 and 24. Each pulley-wheel is caught between the terminal boxes of a respective yoke, as 25 and 26, and these yokes are bolted or otherwise secured in surmounting relation one to the block 18 and the other to the block 19.

Located in laterally spaced paralleling relation to each lower spanner is a respective screw, as 27 and 28, received by its ends in frame-carried thrust and journal bearings 29, and each said screw is provided for some distance from its ends with right and left-hand threads engaging in corresponding threads presented by two brackets 30 which, like the yokes 25 and 26, are bolted or otherwise secured one to the block 18 and the other to the block 19. Controlled rotation of the screws is obtained by a chain-drive 31 running to the screw 27 from a reversing electric motor 32 (Fig. 2), and from this screw 27 a horizontal chain 33 (Fig. 7) carries the drive to the other lower screw 28.

Each of the two pulley-wheels at one end of the frame acts in concert with a related one of the two pulley wheels at the other end of the frame to carry a respective endless conveyor belt 34 for the plywood panels. Energy for driving these belts is passed by a chain 35 to the arbor 20 from a power shaft 36 driven from any suitable source of constant power (not shown).

Reverting to the upper end of the machine, it will be seen that there are grouped about each of the two upper spanners 14 and 15 a respective shaft 37, similar to the arbors 20 and 21 in that the same has a keyway 38 extending for very nearly its entire length, and a respective screw 40 much the same as the screws 27 and 28. Between these two groups at longitudinally spaced intervals, there are provided a plurality, four being shown, of arbors also like or similar to said arbors 20 and 21 in the sense that each provides a key-way extending for the greater part of the length. These four arbors are designated by 41, 42, 43 and 44.

Related to these upper spanners, arbors, shafts and screws are two carriages 39 one located at one side and the other at the other side of the machine's longitudinal median line, and each such carriage extends longitudinally from one to the other spanner 14 and 15 and presents upon its ends a respective journal box 45 to receive a respective said spanner and guide the carriage for endwise sliding movement thereon. Each carriage in addition to presenting the journal bearings 45, is surmounted at each end with an internally threaded box 46 accommodating a related one of the two screws 40, and along the inner and outer edges is surmounted by bossed plates 47 and 48 serving as journals for the two shafts 37 and the four arbors 41, 42, 43 and 44. Between these bossed plates there is keyed to each shaft 37 a respective bevel pinion 50 and there is keyed to each of the four arbors 41, 42, 43 and 44 a respective bevel pinion 51. A respective bevel pinion 52 in mesh with each pinion 50 and a respective bevel pinion 53 in mesh with each pinion 51 is journaled in the related carriage to turn about a vertical axis. Each said driven pinion presents a pendent stem, as 54 and 55, threaded in the instance of the stem 54 and splined in the instance of the stem 55. The threaded stems engage in corresponding threads provided in slides 56, thus to raise and lower the slides by oppositely directed turning movements passed from the shafts 37 through meshed pinions 50 and 52 to the threaded stems 54, and giving support to the slides for guiding the latter in said vertical motion are slide mountings 57 bolted or otherwise secured to legs 58 which depend at each end from the related carriage. A respective bar 60, whose purpose will appear and be understood in the course of the following description, lies to the rear of each slide and extends horizontally from one to the other leg with its ends bolted to the latter.

Figure 5:
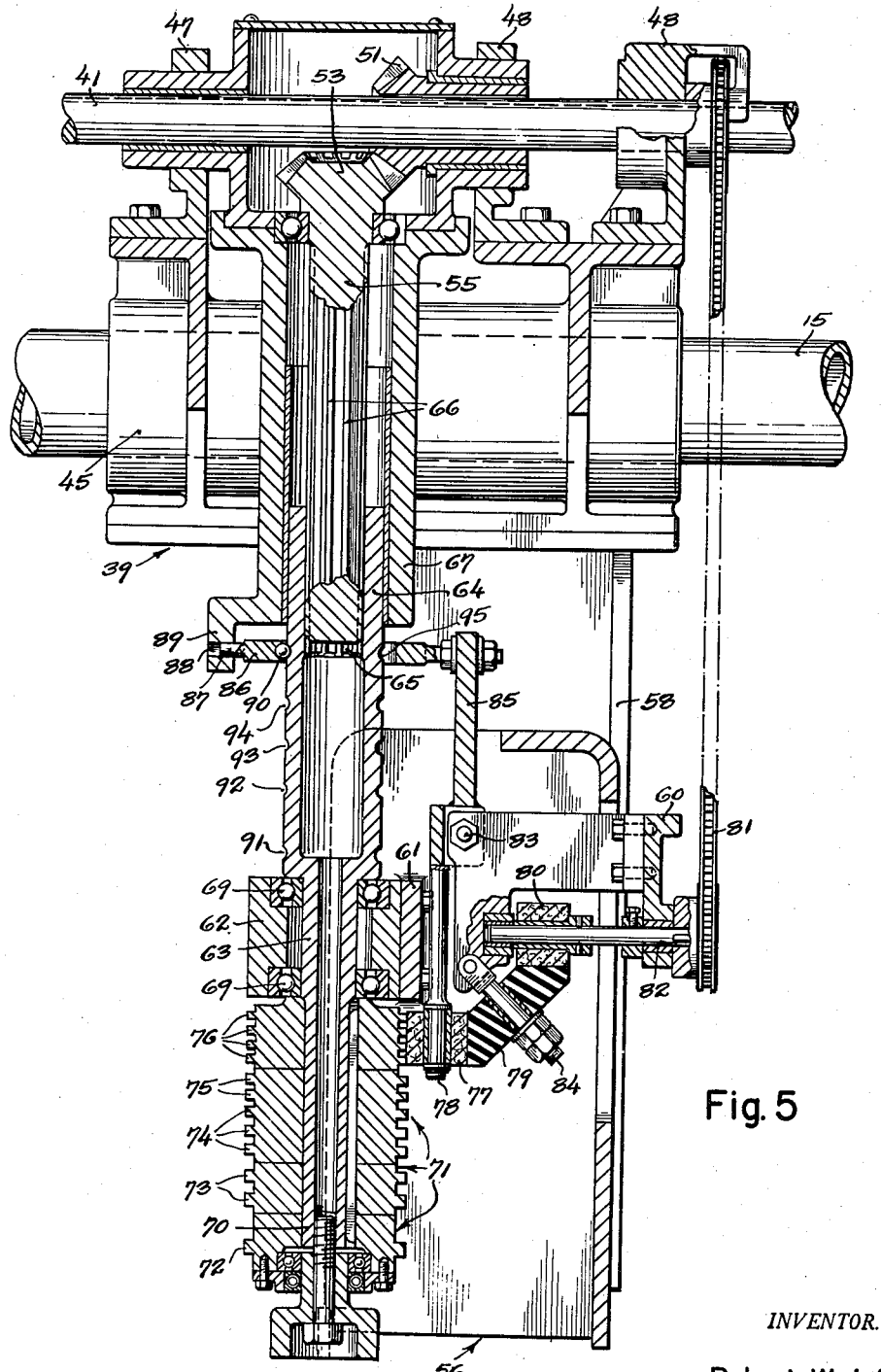
Fig. 5 is an enlarged-scale transverse vertical section on the line 5—5 of Fig. 3.
Figure 4:
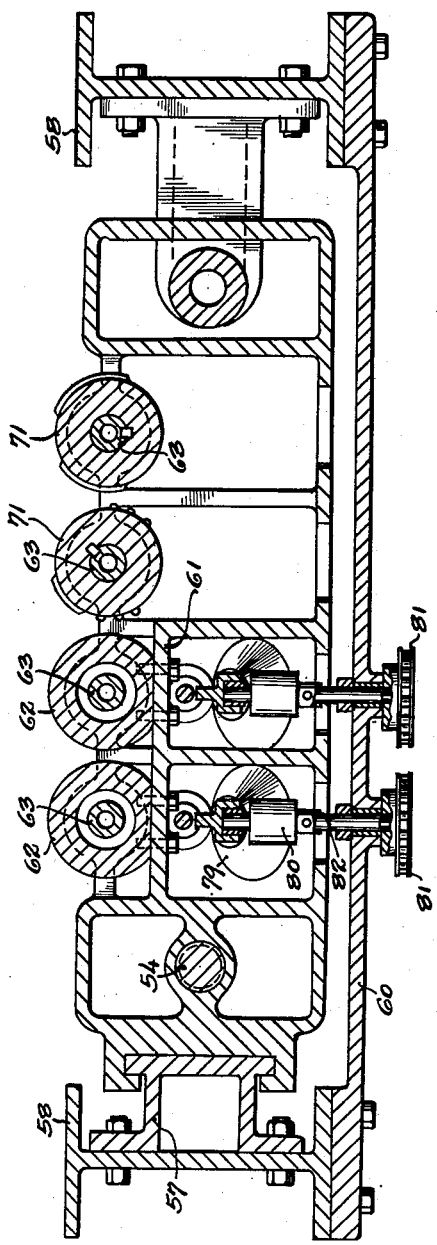
Fig. 4 is a horizontal section on the jogged line 4—4 of Fig. 3.
Figure 8:
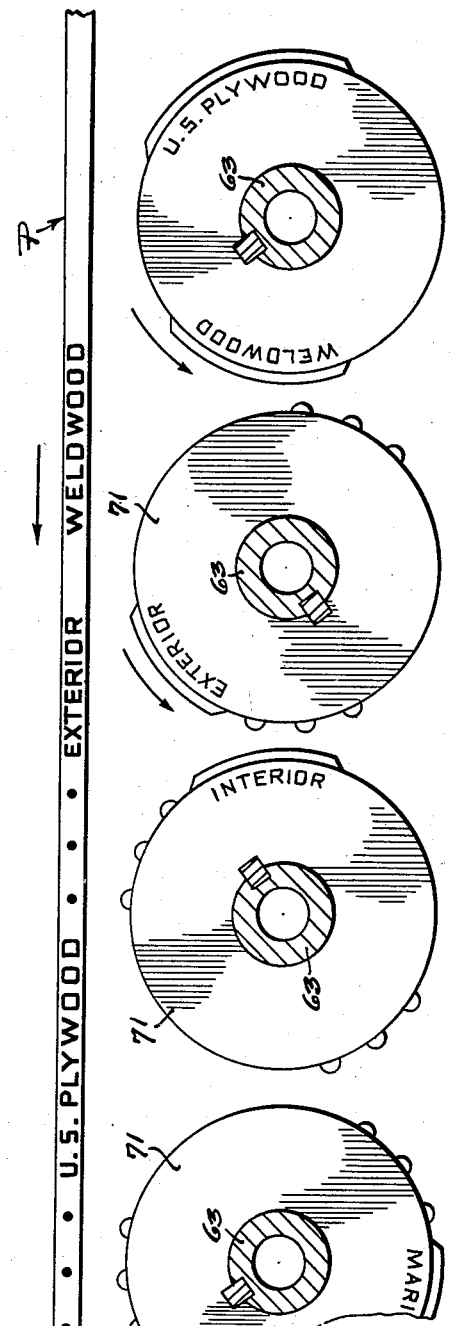
Fig. 8 is a schematic view combining a top plan view of the marking wheels with an edge-elevational view of a panel being marked thereby.

Considering said slides in more particularity, it will be seen from an inspection of Fig. 5 that each slide presents a longitudinally extending rigid horizontal rail 61, and bolted or otherwise secured to this rail so as to occupy a position below and in axial alignment with a respective said splined stem 55 are collars 62. A spindle 63 is journaled by ball bearings 69 in each of these collars, and formed upon the upper end of such spindles is an enlarged tubular head 64 finding a telescopic fit upon the related splined stem 55 and being itself internally formed with splines 65 which mate with the splines 66 of the stem so as to connect the stem and the spindle for unitary rotation. Respective sets of internally bushed cylinders 67 fast to the carriages 39 form journals receiving the stems 55 and slidably supporting the related heads 64.

Each spindle, below said ball-bearing journal, presents a reduced prolongation 70, and keyed to this prolongation and securely held thereon against endwise motion are a set of marking wheels 71. I have elected to show four such wheels in a set, and each such wheel is formed with one or more circumscribing flanges. On all of the flanges of a single said set there appears a corresponding line of reversely disposed printing characters. These lines, when an inked impression is transferred from the wheels to the edge of a sheet of plywood or other like or suitable stock passing the marking wheels, serves to identify the goods. It is customary, in the marking of plywood panels, to show the name and the trademark of the manufacturer, and to also indicate the type of plywood, which is to say whether the same is for "exterior," "interior" or "marine" usage. It is in order to apply said name and trademark of the manufacturer, and to also indicate, selectively, one of the named three uses to which the particular plywood is applied that I have illustrated four sets of said marking wheels, each set being carried by a respective said spindle 63 and hence driven by a respective one of the four arbors 41, 42, 43 and 44.

In furtherance of the marking wheels, the significance of making the marking wheels vertically adjustable and of providing multiple flanges arranged singly or in groups is that this adapts the machine to the marking of the various widths of plywood customarily produced. Also, in the instance of all but the very thickest sheets, it permits stacks of the sheets, two, three or four sheets to a stack, to be fed through the machine so as to mark a plurality of the sheets simultaneously. Considered in more particularity, the standard thicknesses of plywood are ¼", 5/16", ⅜", ½", ⅝", ¾" and 1". The present invention contemplates feeding 1", ¾" or ⅝" panels through the machine singly and employs the single marking flange 72 in such instance. It is proposed that the ½" panels be fed in stacks of two, and the two flanges 73 perform the marking in such case. ⅜" panels and 5/16" panels are fed in stacks of three, using the three flanges 74 in the former instance and employing the uppermost of said flanges 74 together with the two flanges 75 in the latter instance. ¼" panels are fed in stacks of four, and employ the four uppermost flanges 76. An inking roll 77 composed of an absorbent cushion material lies to the rear of the marking wheels in position to ink the particular marking flanges which are in use, being journaled upon an arm 78 for rotation about a vertical axis and bearing against a bevel wheel 79 of rubber or other elastic material. Wheel 79 transfers ink to the roll 77 from a roll 80, also composed of an absorbent cushion material, onto which the ink drips from an overhead valved source of suitable supply (not shown). Power for driving the roll 80 is passed by a chain 81 from the related arbor 40, 41, 42 or 43, as the case may be, to a horizontal spindle 82 on which the roll 80 is carried.

Said arm 78 which carries the inking roll 77 has its upper end fulcrumed, as at 83, so as to enable the roll to be backed off in the moderate degree necessary to clear the marking flanges when the latter are being raised or lowered, and in compensation of this moderate swing movement, which perforce exerts pressure upon the ink-transferring wheel 79, the supporting pin 84 for the latter is swingably mounted, enabling the elastic rubber of the wheel to be compressed between rolls 77 and 80. A lever-arm 85 integral with the arm 78 extends upwardly from the fulcrum and at its upper end connects with a ring 86 loosely surrounding the vertically movable head 64. Diametrically opposite from the lever-arm said ring presents a stud projection 87 slidably fitting a guide-hole 88 drilled in a toe dependency 89 of the cylinder 67. Upon the inner surface of the ring at the side thereof opposite from the lever-arm there is provided a detent in which a ball 90 is lodged, and formed in the periphery of the cylinder to selectively engage this ball are a set of five vertically spaced circumscribing grooves, as 91, 92, 93, 94 and 95. The spacing of these grooves corresponds to the spacing between the several settings of the marking wheels, and this is to say that the ball 90 lodges in the groove 95 when the four flanges 76 are in panel-marking position, lodges in the groove 94 when the two flanges 75 together with the uppermost of the three flanges 74 are in marking position, lodges in the groove 93 when the three flanges 74 are in marking position, lodges in the groove 92 when the two flanges 72 are in marking position, and lodges in the groove 91 when the single flange 72 is in marking position. It will be apparent that the ejection of the ball from the grooves as the marking wheels are moved vertically up or down between said stations presses the ring inwardly thus drawing the lever-arm 85 inwardly and responsively forcing the inking roll outwardly away from the marking flanges. Thus the inking roll 77 is backed off to automatically clear in response to a vertical movement of the marking wheels.

The shafts 37, which act through pinions 50 and 52 to impart turning movement to the jack-screws 54 so as to raise and lower the slides 56, are rotated manually by a chain 96 activated by a hand wheel 97, the chain (see Fig. 1) tracing a substantially rectangular path, with sprocket wheels for each of the two shafts 37, for the driving sprocket wheel, and for an idler sprocket wheel occupying the four corners of the rectangle. For the operation of the arbors 41, 42, 43 and 44, power is drawn from the power shaft 36 and passed by a chain 98 to a shaft 99 and thence by a chain 100 to one of four jack-shafts 101 each of which is axially aligned with a related one of the four arbors. Horizontal chains 102 pass the power from one to another of said jack-shafts. On each jack-shaft there is splined a clutch element 103 which is adapted to be shifted endwise selectively into and out of engagement with a complementing clutch element 104 pinned to the related arbor. Respective shipping forks 105 are activated manually by control knobs 106. A vertical chain 107 carries power from the lower set of screws 27 and 28 to one of the upper screws 40, and a horizontal chain 108 carries this drive from the one to the other of said upper screws.

The operation of the described machine is as follows: Assume that the machine is to handle stacks of 4—4' x 8'—¼" exterior plywood panels, then motor 32 is energized to activate the upper and lower pairs of screws 40—40, and 27—28, in the direction and degree necessary to establish a 4 ft. spacing between the marking wheels at one side and the marking wheels at the other side of the throat through which the stacked panels are conveyed. The vertical setting given to the marking wheels is as shown in the drawings, and this is to say with the uppermost group of four flanges 76 occupying the horizontal plane along which the stacked panels are conveyed. Inasmuch as only the first and second of the series of four marking wheels is here required to perform a marking function, the ink is permitted to drip from the respective sources of supply only upon the bevel rolls 80 associated with the first and second wheels. In the arrangement as I have here elected to show the same, all four marking wheels are adjusted simultaneously from a single hand wheel, wherefor all four wheels bear upon the traversing conveyed panels. However, only two of such wheels are inked. It is self-evident, if desired, that the marking wheels can be individually adjusted so as to permit non-used wheels to be shifted into positions whereat the same will be free of contact with the conveyed panels.

It should perhaps be here noted that the dotted line disclosure of drive chains in Fig. 1 is not complete, and this is to say that certain chains shown in other views of the drawings are deleted from this view to obviate confusion, and namely the horizontal chain 33 running between the two lower screws 27—28, the chain 107 running between the two upper screws 40—40, and the diagonal chain 35 running from the power shaft 36 to the arbor 20. It is of import to note that the source of power for rotating the marking wheels is the same as that which drives the conveyor, and that the inking rolls likewise derive their driving energy from this same source. This precludes liability of scuffing in that it enables the inking rolls and the marking wheels to have a corresponding rim speed identical with the progress of the conveyed panels designated by the letter P.

It is thought that the machine and the manner of its operation will have been clearly understood from the foregoing detailed description of the preferred embodiment which I have elected to illustrate. It is believed to be apparent that changes in the details of construction may be resorted to without departing from the spirit of the invention, wherefor it is my intention that no limitations be implied and that the hereto annexed claims be given a scope fully commensurate with the broadest interpretation to which the employed language fairly admits.

I claim:

1. A machine for edge-marking plywood panels comprising, in combination: means for conveying successive plywood panels either single or in stacks along a given horizontal travel path with at least one side edge exposed beyond the related side limit of the conveying means, a type-wheel axially shiftable into a plurality of adjusted settings selectively and journaled for rotation about a vertical axis in such a position along said travel path as causes the type-wheel to mark each panel as the latter traverses the type-wheel in course of its conveyed travel, means for rotating said type-wheel at a rim speed corresponding to the travelling speed of the conveyed panel, an inking roll normally pressing against said type-wheel for continuously inking said rotating type-wheel, and means made to operate as the type-wheel moves in course of being shifted into any one of its adjusted settings for automatically backing off the inking roll from the type-wheel so that the motion of the type-wheel will not scuff the roll.

2. The machine of claim 1 in which the type-wheel is mounted for bodily adjustment inwardly and outwardly toward and from the conveyor, and manually controlled means for making said adjustment.

3. In a marking machine, in combination: a marking wheel mounted for rotation about a vertical axis and provided with a plurality of axially spaced peripherally disposed lines of type characters, a source of ink supply, a revolubly mounted inking roll fed from said source and pressing against said marking wheel, means for moving said wheel selectively into several axially adjusted positions, and means operating by the act of moving said wheel in its endwise adjustment for in each instance automatically backing off the inking roll so that the axial motion of the wheel will not scuff the roll.

4. In a panel-marking machine, a frame presenting upright cheeks at each side thereof, upper and lower pairs of longitudinally spaced spanners extending transversely between said cheeks and serving as track-bars, a respective screw-shaft and a respective splined-shaft each journaled for rotation and extending transversely between said cheeks in proximity of each track-bar, said screw-shafts having the threads right-hand upon one end and left-hand upon the other end, a splined arbor also journaled for rotation and extending transversely between said cheeks, a block slidably mounted upon each lower track-bar at each side of the machine and each having attached thereto a bracket threadably engaging the related screw-shaft and a yoke slidably engaging the related splined shaft, pairs of pulley wheels splined to each of the two lower splined shafts between the arms of said yokes so as to rotate in unison with the splined shafts and partake of endwise motion by endwise movement of the blocks, longitudinally extending endless conveyor belts passing about said paired pulley wheels at each side of the machine, a respective longitudinally extending carriage at each side of the machine each slidably mounted upon the upper pair of track-bars and each threadably engaging the upper two screw-shafts, a pair of toothed pinions carried by each of said carriages and splined one to one and the other to the other of the two upper spline-shafts, a respective toothed pinion in mesh with each of said first-named pinions and journal-mounted in the related carriage for rotation about a vertical axis, a respective jack-screw fast to each of said last-named pinions, respective head-frames carried for vertical sliding movement by the carriages and each threadably engaged by the related two jack-screws, a respective third toothed pinion carried by each carriage and splined to the arbor, a toothed pinion in mesh with each of the last-named pinions journal-mounted in the related carriage for rotation about a vertical axis and each presenting a pendent splined stem, and a marking wheel carried by each head-frame for rotation about an axis coinciding with the related pendent stem and each splined to the latter so as to turn in unison therewith while admitting to vertical movement in relation thereto.

5. The machine of claim 4 in which the marking wheel presents multiple axially spaced circumscribing lines of type characters so arranged in selectively used groups as to accommodate the machine to the edge-marking of panels conveyed either individually or in stacks with the component panels in the stacks being of differing thicknesses selectively.

6. The machine of claim 4 in which the arbor and the lower spline-shaft are driven from a source of power common to both imparting to the marking wheel a rim speed corresponding to the travelling speed of the conveyor belts.

7. The machine of claim 4, and a device including an inking roll bearing against the marking wheel for inking selected type characters of the marking wheel.

8. A machine according to claim 7 having means for automatically moving the inking roll out of contact with the marking wheel as the marking wheel is adjusted axially.

9. A machine according to claim 5 in which a plurality of selectively employed marking wheels are provided.

10. In a conveyor, a frame presenting upright cheeks at each side thereof, a pair of longitudinally spaced spanners extending transversely between said cheeks and serving as track bars, a respective screw-shaft and a respective spline-shaft each journaled for rotation and extending transversely between said cheeks in proximity of each track bar, said screw-shafts having the threads right-hand upon one end and left-hand upon the other end, a block slidably mounted upon each track-bar at each side of the machine and each having attached thereto a bracket threadably engaging the related screw-shaft and a yoke slidably engaging the related spline-shaft, pairs of pulley wheels splined to each of the two spline-shafts between the arms of the yokes so as to rotate in unison with the spline-shafts and partake of endwise motion by endwise movement of the blocks, longitudinally extending endless conveyor belts passing about said paired pulley wheels at each side of the machine, and means for rotating said spline-shafts.

11. In a panel-marking machine, a frame presenting upright cheeks at each side thereof, a spanner extending transversely between said cheeks and serving as a track-bar, a screw-shaft and a splined arbor each journaled for rotation and extending transversely between said cheeks in proximity of the track-bar, said screw-shaft having the threads right-hand upon one end and left-hand upon the other end, a respective carriage at each side of the machine each slidaby mounted upon the track bar and each threadably engaging the screw-shaft, a toothed pinion carried by each of said carriages and spined to the arbor, a respective toothed pinion in mesh with each of the first-named pinions journal-mounted in the related carriage for rotation about a vertical axis and each presenting a pendent splined stem, respective head-frames carried for vertical adjustment by the carriages, means for setting said head-frames in vertical adjusted positions, and a respective marking wheel carried by each head-frame for rotation about an axis coinciding with the related pendent stem and each splined to the latter so as to turn in unison therewith while admitting to vertical movement in relation thereto.

12. In a marking machine, an arbor journaled for rotation about a horizontal axis, a toothed pinion on said arbor, a toothed pinion in mesh with said arbor-driven pinion journaled for rotation about a vertical axis and presenting a pendent splined stem, a vertically adjustable head-frame adjacent said stem, a marking wheel carried by the head-frame for rotation about an axis coinciding with the related pendent stem and splined to the latter so as to turn in unison therewith while admitting to vertical movement in relation thereto, and an inking roll bearing against said marking wheel and powered by a chain driven from a sprocket wheel fast to said arbor.

13. In the marking of standard plywood panels having thicknesses of ¼", ⁵⁄₁₆", ⅜", ½", ⅝", ¾", and 1", means for conveying the panels successively either singly or in stacks along a given horizontal travel path, an axially movable marking wheel journaled for rotation about a vertical axis in a localized position along said travel path whereat the same will mark said single or stacked panels as they move with the conveying means, said wheel being provided with a set of twelve circumscribing marking flanges spaced apart at intervals of the length, and means for locating the wheel at a selected one of four axially spaced settings, the spacings between said flanges being so related one to another and to the settings that the first flange will mark single panels of either 1", ¾" or ⅝" thickness, the next two flanges will mark stacks of two ½" panels, the next three flanges will mark stacks of three ⅜" panels, the uppermost of the last-mentioned three flanges and the next two flanges will mark stacks of three ⁵⁄₁₆" panels, and the last four flanges will mark stacks of four ¼" panels.

References Cited in the file of this patent
UNITED STATES PATENTS

| | | |
|---|---|---|
| 868,793 | Metzner | Oct. 22, 1907 |
| 1,288,084 | McDonough | Dec. 17, 1918 |
| 1,367,066 | McDonough | Feb. 1, 1921 |
| 1,385,185 | Meahl | July 19, 1921 |
| 2,109,590 | Kimball | Mar. 1, 1938 |
| 2,378,948 | Paxton et al. | June 26, 1945 |
| 2,425,218 | Worthington | Aug. 5, 1947 |
| 2,691,341 | Williams | Oct. 12, 1954 |